US010570218B2

(12) United States Patent
Barnicki et al.

(10) Patent No.: US 10,570,218 B2
(45) Date of Patent: *Feb. 25, 2020

(54) VULCANIZING COMPOSITION CONTAINING CYCLODODECASULFUR AND IMPROVED CYCLODODECASULFUR COMPOUND

(71) Applicant: Eastman Chemical Company, Kingsport, TN (US)

(72) Inventors: Scott Donald Barnicki, Kingsport, TN (US); Frederick Ignatz-Hoover, Elyria, OH (US); Robert Thomas Hembre, Johnson City, TN (US); Andrew Neil Smith, Wadsworth, OH (US); Henk Kreulen, Halsteren (NL)

(73) Assignee: Eastman Chemical Company TN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/991,122

(22) Filed: May 29, 2018

(65) Prior Publication Data

US 2018/0327516 A1 Nov. 15, 2018

Related U.S. Application Data

(62) Division of application No. 15/015,165, filed on Feb. 4, 2016, now Pat. No. 10,011,663.

(51) Int. Cl.
| | |
|---|---|
| *C08K 3/06* | (2006.01) |
| *C08C 19/20* | (2006.01) |
| *C01B 17/02* | (2006.01) |
| *C01B 17/06* | (2006.01) |
| *C08K 3/30* | (2006.01) |
| *C08K 5/47* | (2006.01) |
| *C08K 3/011* | (2018.01) |

(52) U.S. Cl.
CPC .............. *C08C 19/20* (2013.01); *C01B 17/02* (2013.01); *C01B 17/0232* (2013.01); *C01B 17/06* (2013.01); *C08K 3/011* (2018.01); *C08K 3/30* (2013.01); *C08K 5/47* (2013.01); *C08K 3/06* (2013.01)

(58) Field of Classification Search
CPC . C08C 19/20; C08J 3/24; C08K 3/011; C08K 3/06; C08K 3/30
See application file for complete search history.

(56) References Cited

U.S. PATENT DOCUMENTS

| | | |
|---|---|---|
| 1,875,372 A | 9/1932 | EndreS |
| 2,419,309 A | 4/1947 | Belchetz |
| 2,419,310 A | 4/1947 | Belchetz |
| 2,460,365 A | 2/1949 | Schallis |
| 2,462,146 A | 2/1949 | Walcott et al. |
| 2,513,524 A | 7/1950 | Schallis |
| 534,063 A | 12/1950 | Ross et al. |
| 2,757,075 A | 7/1956 | Haimsohn |
| 3,844,941 A | 10/1974 | Jones |
| 3,891,743 A | 6/1975 | Block |
| 4,017,467 A | 4/1977 | Doss |
| 4,238,470 A * | 12/1980 | Young ..................... C01B 17/12 |
| | | 423/567.1 |
| 4,242,472 A | 12/1980 | Hoshino et al. |
| 4,740,559 A | 4/1988 | Johansson et al. |
| 4,752,507 A | 6/1988 | Johansson et al. |
| 4,870,135 A | 9/1989 | Mowood et al. |
| 6,319,993 B2 | 11/2001 | Weidenhaupt et al. |
| 6,420,581 B1 | 7/2002 | Lodaya et al. |
| 6,441,098 B2 | 8/2002 | Halko et al. |
| 6,624,274 B1 | 9/2003 | Suddaby |
| 7,569,639 B2 | 8/2009 | Choi et al. |
| 7,662,874 B2 | 2/2010 | Korth et al. |
| 8,859,719 B2 | 10/2014 | Mohamed et al. |
| 10,011,663 B2 | 7/2018 | Barnicki et al. |
| 10,280,281 B2 | 5/2019 | Barnicki et al. |
| 2014/0020808 A1 | 1/2014 | Watanabe |
| 2014/0116594 A1 | 5/2014 | Miyazaki |
| 2014/0200383 A1 | 7/2014 | Marks et al. |
| 2014/0213708 A1 | 7/2014 | Kushida |
| 2017/0002153 A1 | 1/2017 | Osumi |
| 2017/0253484 A1 | 9/2017 | Barnicki et al. |

FOREIGN PATENT DOCUMENTS

| | | |
|---|---|---|
| CN | 101 837 958 A | 9/2010 |
| CN | 103 601 156 A | 2/2014 |
| EP | 0846722 B1 | 4/2002 |
| EP | 1500630 A2 | 1/2005 |
| EP | 2128153 B1 | 8/2013 |
| WO | WO 2003060002 | 7/2003 |

OTHER PUBLICATIONS

Steudel et al., J. Molecular Spectroscopy 51 (1974) 189-193.*
Steudel et al., Z.anorg. allg. Chem. 5 (1984) 7-42.*
Schmidt et al., Chem. Ber. 101 (1968) 381-382.*
Bueno-Ferrer et al., J. Rare Earths 28 (2010) 647-653.*
Chen et al., Analytical Chem. 84 (2012) 4088-4094.*
ASTM D1993-03 (2013).
Bueno-Ferrer et al., Journal of Rare Earths, 28, 2010, "Relationship between surface area and crystal size of pure and doped cerium oxides", pp. 647-653.
Chen et al., "Quantitative Analysis of Powder Mixtures by Raman Spectrometry: the influence of particle size and its correction", Analytical Chemistry, 84, 2012, pp. 4088-4094.
Choi et al. "Thermal Aging Behaviors of Elemental Sulfur-Free Polyisoprene Vulcanizates" *Bull. Korean Chem. Soc.*, Col. 26, 2005, pp. 1853-1855.
Eckert et al. "Elemental Sulfur and Sulfur-Rich Compounds" *Springer*, 2003, pp. 10-54.

(Continued)

*Primary Examiner* — Roberto Rabago
(74) *Attorney, Agent, or Firm* — Michael K. Carrier

(57) ABSTRACT

A vulcanizing composition useful for the vulcanization of vulcanizable formulations is disclosed. The vulcanizing composition includes a vulcanizing agent which in turn includes a cyclododecasulfur compound. A cyclododecasulfur compound characterized by a DSC melt point onset of between 155° C. and 167° C. when measured at a DSC heat rate of 20° C./minute is also disclosed.

11 Claims, No Drawings

(56) References Cited

OTHER PUBLICATIONS

Leste-Lasserre, Pierre "Sulfur Allotrope Chemistry" *McGill University*, 2001, pp. 119-132.

Masamichi Ikeda et al., Radioisotopes, "Measurements of Sulfure Solubility and Diffusibility in Rubber by Tracer Method", vol. 20, No. 10, p. 556, (1973).

Mausle, H.J.; Steudel, R., "Simple preparation of Cyclohexasulfur (S6) from dichlorodisulfane (S2Cl2) and ionic iodides", Z. anorg. allg. Chem. 463, 1980, pp. 27-31.

Steudel, R.; Strauss, R.; Koch, L., "Quantitative HPLC Analysis and Thermodynamics of Sulfur Melts", Angew. Chem. Int. Ed. Engl., 24(1), 1985, pp. 59-60.

Steudel, R..: Mausle, H.-J., "Detection of Large-Ring Sulfur Molecules in Liquid Sulfur: Simple Preparation of S12, α-S18, S20 from S8", Angew, Chem. Int. Ed. Engl., 18(2), 1979, pp. 152-153.

Steudel, R.; Eckert, B., "Solid Sulfur Allotropes", Topics in Current Chemistry (2003), 230, pp. 1-79.

Steudel et al., "Infrared and Raman Spectra of Cyclo Dodecasulphur" Journal of Molecular Spectroscopy, 51, 1974, pp. 189-193.

Schmidt, M.; Block, H.-D., "Occurrence of Cyclododecasulfur in Sulfur Melts", Angew. Chem. Int. Ed. Engl., 6(11), 1967, pp. 955-956.

Schmidt, M.; Wilhelm, E., "Cyclodocecasulfur, S12", Angew. Chem. Int. Ed. Engl., 5(11), 1966, pp. 964-965.

Steudel, R.; Steidel, J.; Sandow, T., "Representation, Crystal Structure and Vibrational Spectra of CycloUndecasulfur and Cyclotridecasulfur", Z. Natureforsch B 1986, 41, pp. 958-970.

Schmidt, M.; Knippschild, G.; Wilhelm, E., "Memorandum on a Simplified Synthesis of Cyclododecasulfure $S_{12}$" Chem. Ber., 101 1968, p. 381-382.

Schmidt, M.; Block, B.; Block, H.D.; Kopf, H.; Wilhelm, E., "Cycloheptasulfur, S7, and Cyclodocecasulfur, S10—Two New Sulfur Rings", Angew. Chem. Int. Ed. Engl., 7(8), 1968, pp. 632-633.

Inorganic Chemistry by Duward Shriver, P.W. Atkins and Cooper Langford, W. H. Freeman & Co., 1990, pp. 407-408.

Copending U.S. Appl. No. 15/015,165, filed Feb. 4, 2016, Barnicki, et al.

Office Action dated Jul. 5, 2016 received in co-pending U.S. Appl. No. 15/015,165.

Office Action dated Jan. 13, 2017 received in co-pending U.S. Appl. No. 15/015,165.

Copending U.S. Appl. No. 15/440,056, filed Feb. 23, 2017, Barnicki, et al. Now Publication No. 2017-0253484.

Copending U.S. Appl. No. 15/440,007, filed Feb. 23, 2017, Barnicki, et al.

Steudel, Ralf, "Elemental Sulfur and Related Homocyclic Compounds and Ions", Studies in Inorganic Chemistry, 1984, v5, p. 3.

PCT International Search Report and Written Opinion dated Mar. 23, 2017 for International Application No. PCT/US2016/067695.

Steudel et al, Thermal Polymerization and Depolymerization Reactions of 10 Sulfer Allotropes Studied by HPLC and DSC, vol. 517, No. 10, pp. 7-42, Oct. 1, 1984.

PCT International Search Report and Written Opinion dated Apr. 19, 2017 for International Application No. PCT/US2017/019881.

Steudel, Ralph et al, "A New Allotrope of Elemental Sulfur: Convenient Preparation of cyclo-S 14 from S 8", Angew. Chem, Int. Ed., Jan. 1, 1998, pp. 2377-2378.

Moeckel, Herman, "Separation of dihydrogen polysulfides (polysulfanes) using reversed-phase HPLC", Fresenius' Zeitschrift Fuer Analytische Chemie, vol. 318, No. 2, 1984, pp. 116-120.

Zysman-Colman, Eli et al., "Probing the chemistry of rare sulfur allotropes: S9, S12 and S20", Journal of Sulfur Chemistry, vol. 29, No. 3-4, 2008, pp. 309-326.

PCT International Search Report and Written Opinion dated May 11, 2017 for International Application No. PCT/US2017/019888.

Office Action dated Jun. 30, 2017 received in co-pending U.S. Appl. No. 15/015,165.

Copending U.S. Appl. No. 15/659,094, filed Jul. 25, 2017, Barnicki et al.

Office Action dated Nov. 22, 2017 received in co-pending U.S. Appl. No. 15/440,007.

Office Action dated Nov. 24, 2017 received in co-pending U.S. Appl. No. 15/440,056.

Buskirk, P.R. Van, et al, Practacle Parameters for Mixing, Rubber Chemistry and Technology, vol. 48, pp. 577-591, May 1975.

Kim, Pan Soo, et al, Flow Visualization of Intermeshing and Separated Counter-Rotating Rotor Internal Mixer, Rubber Chemistry and Technology, vol. 67, pp. 880-891, Apr. 1994.

Manas-Zloczower, I. et al, Dispersive Mixing in Internal Mixers—A Theoretical Model Based on Agglomerate Rupture, vol. 55, pp. 1250-1285, 1982.

Notice of Allowance dated Mar. 20, 2018 received in co-pending U.S. Appl. No. 15/440,056.

Notice of Allowance dated Mar. 26, 2018 received in co-pending U.S. Appl. No. 15/440,007.

Notice of Allowance dated May 3, 2018 received in co-pending U.S. Appl. No. 15/015,165.

Office Action dated May 3, 2018 received in co-pending U.S. Appl. No. 15/659,094.

Copending U.S. Appl. No. 15/991,122, filed May 29, 2018, Barnicki et al.

Copending U.S. Appl. No. 15/995,574, filed Jun. 1, 2018, Barnicki et al.

Notice of Allowance dated Dec. 21, 2018 received in co-pending U.S. Appl. No. 15/659,094.

PCT International Search Report and Written Opinion dated Oct. 9, 2018 for International Application No. PCT/US2018/042402.

Kuznetsov, A. A. et al., "Investigation of the process of vulcanization bypolymeric Sulphur in the metastable state", International Polymer Science and Technology, vol. 29, No. 1, Jan. 2002, pp. T/1-T/3.

Znak, Z.O, et al. Physicochemical Properties of Rubber Compositions Vulcanized by Polymeric Sulfur, Materials Science, vol. 52, No. 3, Nov. 2016, pp. 407-413.

Copending U.S. Appl. No. 16/123,591, filed Sep. 6, 2018, Barnicki et al.

Copending U.S. Appl. No. 16/358,078, filed Mar. 19, 2019, Barnicki et al.

Office Action dated Jul. 26, 2019 received in co-pending U.S. Appl. No. 15/995,574.

\* cited by examiner

VULCANIZING COMPOSITION CONTAINING CYCLODODECASULFUR AND IMPROVED CYCLODODECASULFUR COMPOUND

RELATED APPLICATIONS

This Divisional application claims the priority of U.S. Non-provisional patent application Ser. No. 15/015,165 filed Feb. 4, 2016, now U.S. Pat. No. 10,011,663, the entire disclosure of which is incorporated herein by reference.

FIELD OF THE INVENTION

The present invention relates generally to (i) a vulcanizing composition for use in forming a vulcanized article, wherein the composition includes a cyclododecasulfur compound and (ii) a cyclododecasulfur compound that exhibits an elevated melting point onset relative to prior art forms of cyclododecasulfur

BACKGROUND OF THE INVENTION

Sulfur vulcanization is a well-known chemical process for converting natural rubber or other general purpose elastomers into more durable materials via the formation of crosslinks between individual polymer chains through addition of and reaction with certain vulcanizing agents (also known as "sulfur-containing curatives"). In conventional processes for the manufacture of durable vulcanized elastomeric articles, a sulfur-containing curative is mixed with an elastomeric compound to form a vulcanizable elastomeric formulation that includes the sulfur-containing curative. The vulcanizable elastomeric formulation is subjected to a number of processing steps such as for example mixing, extruding, calendering, shaping, forming and building into the shape(s) of a desired "green" (unvulcanized) article or article component ("article"). The article is then subjected to conditions necessary to vulcanize the elastomer and form a vulcanized elastomeric article.

Current industry practice has embraced polymeric sulfur as a preferred vulcanizing agent in many commercial sulfur vulcanization processes. For example, U.S. Pat. No. 4,238,470, the disclosure of which is incorporated herein by reference, describes the use of polymeric sulfur as a sulfur vulcanizing agent for a vulcanizable elastomeric composition. Polymeric sulfur is generally characterized by a high molecular weight, a long, helical molecular structure and insolubility in carbon disulfide and other strong solvents as well as in rubber, rubber compounds and elastomers. In a typical sulfur vulcanization process step, a vulcanizable elastomeric formulation containing polymeric sulfur is subjected to conditions in which the polymeric sulfur converts to cyclooctasulfur ($S_8$), a sulfur allotrope that is soluble in elastomers and which therefore dissolves into the elastomeric formulation wherein it can take part in the vulcanization reactions.

Because the conversion of polymeric sulfur to cyclooctasulfur is temperature dependent and the effects of time and temperature on the conversion are cumulative, great care must be taken to ensure that the processing steps prior to final shaping, building or assembling of the vulcanized article prior to actual vulcanization do not initiate the conversion prior to the actual vulcanization step. Such premature conversion could result in sulfur "bloom", a known phenomenon highly detrimental to interply adhesion and other vulcanized article characteristics. Sulfur bloom is the result of diffusion of soluble cyclooctasulfur and subsequent crystallization of sulfur on the surface of an uncured article and occurs when cyclooctasulfur concentrations in the green vulcanizable elastomeric formulation exceed their solubility limit in the formulation at a given temperature. The presence of sulfur bloom on the surface on an uncured article component or ply is highly detrimental to tack and adhesion of that component to other components/plies. In order to avoid premature conversion to cyclooctasulfur and the risk of bloom in vulcanizable elastomeric formulations with polymeric sulfur vulcanizing agents, current commercial practice includes limiting extended processing times to temperatures below about 100° C., as even a small percentage of conversion of polymeric sulfur to cyclooctasulfur may push the concentration past the solubility limit and create the potential for bloom. The shearing actions present in (and frictional heat generated by) the extrusion, calendering, shaping, forming, or other processing operations therefore present demanding temperature control challenges to the article manufacturers.

Management of these challenges typically involves a delicate balance between productivity, throughput, processing speed and product cost on one hand and product performance and quality on the other. Limitations implemented to reduce risk of premature polymeric sulfur conversion and bloom slow the manufacturing speed and thus reduce manufacturer profitability. Conversely a vulcanizing agent with less premature conversion propensity (and accordingly higher thermal stability) would increase manufacturing speed and accordingly the number of units a plant can create and the manufacturer's profit. In addition to faster manufacturing speeds, if the conversion from polymeric to cyclooctasulfur could be reduced, then the compounder has greater flexibility to incorporate more sulfur in a vulcanizable composition thereby having greater potential to manufacture goods of even higher quality and durability.

The prior art has attempted to improve polymeric sulfur thermal stability and retard or resist sulfur bloom through use of various stabilizers or stabilization treatments, as described for example in the above-mentioned '470 patent as well as U.S. Pat. Nos. 2,460,365; 2,462,146 and 2,757,075. Despite all these efforts, a continuing need exists for sulfur vulcanizing agents with higher thermal stability that translates to improved throughput and efficiency for vulcanized article manufacturers while avoiding the risks and detriments of bloom.

SUMMARY OF THE INVENTION

In a first aspect, the present invention relates to a vulcanizing composition having improved thermal stability in a vulcanizable elastomeric compound usable to form a vulcanized elastomeric article. The vulcanizing composition generally includes a vulcanizing agent wherein the vulcanizing agent includes a cyclododecasulfur compound. The composition optionally further includes a carrier. Preferably, the cyclododecasulfur compound is characterized by a melt point onset of from about 155° C. to about 167° C. when measured according to the well-established method of differential scanning calorimetry (hereafter referred to as DSC melt point onset) when measured at a DSC heat rate of 20° C./minute.

In another aspect, the present invention relates to a vulcanizable elastomeric formulation that includes at least one elastomer and a vulcanizing agent wherein the vulcanizing agent includes a cyclododecasulfur compound. Preferably, the cyclododecasulfur compound is characterized by a DSC melt point onset of from 155° C. to 167° C. when measured at a DSC heat rate of 20° C./minute.

In another aspect, the present invention relates to a vulcanizing agent masterbatch that includes a vulcanizing agent in an elastomeric carrier, wherein the vulcanizing agent includes a cyclododecasulfur compound.

In yet another aspect, the present invention relates generally to a cyclododecasulfur compound that exhibits an elevated melting point relative to known forms of cyclododecasulfur and other features desirable when the cyclododecasulfur is used as a vulcanizing agent in a vulcanizing composition for vulcanizable elastomers. More specifically, the present invention is directed to a cyclododecasulfur compound characterized by a DSC melt point onset of from 155° C. to 167° C. when measured at a DSC heat rate of 20° C./minute.

Further aspects and areas of applicability will become apparent from the description provided herein. It should be understood that the description and specific examples are intended for purposes of illustration only and are not intended to limit the spirit and scope of the present invention.

DETAILED DESCRIPTION

As utilized herein, the following terms or phrases are defined as follows:

"Cyclododecasulfur compound" means a cyclic allotrope of sulfur in which twelve sulfur atoms are formed into a single homocyclic ring, also referred herein as $S_{12}$.

"Elastomer" means any polymer which after vulcanization (or crosslinking) and at room temperature can be stretched, compressed or sheared under stress and, upon immediate release of the stress, will return with force to approximately its original proportionate dimensions, including without limitation rubber.

"Vulcanizing Agent" means a material efficacious in effecting vulcanization of a vulcanizable formulation when under vulcanization conditions.

"Vulcanizing Composition" means a combination of ingredients usable as an additive to effect vulcanization of a vulcanizable formulation under vulcanization conditions.

"Vuclanizable Elastomeric Formulation" means a composition that includes a vulcanizing agent and an elastomer and that is capable of vulcanization when placed under vulcanization conditions.

In a first aspect, the present invention is directed to a vulcanizing composition for use in forming a vulcanized article. The composition includes a vulcanizing agent wherein the vulcanizing agent includes a cyclododecasulfur compound. It has been unexpectedly discovered that the vulcanizing agent in the vulcanizing composition of the present invention demonstrates improved thermal stability in a vulcanizable formulation usable to form a vulcanized article. In a preferred embodiment, the vulcanizable formulation is a vulcanizable elastomeric formulation and the vulcanized article is a vulcanized elastomeric article.

Preferably, the vulcanizing agent of the vulcanizing composition of the present invention includes a cyclododecasulfur compound characterized by a DSC melt point onset of from 155° C. to 167° C. when measured at a DSC heat rate of 20° C./minute.

The vulcanizing composition of the present may further include a carrier. Suitable carriers for the vulcanizing composition are typically non-elastomeric and substantially inert with respect to the cyclododecasulfur of the present invention and may include any one or more additional ingredients for example process oil, stearic acid, cellulosic binder such as a carboxymethylcellulose, cellulose ether or esters, xanthans and the like, vegetable oil, epoxidized vegetable oil, polymeric binder or dispersing agent such as a general purpose elastomer or olefinic polymer or copolymer.

The vulcanizing agent in the vulcanizing composition of the present invention preferably includes from about 20% to 100% by weight, more preferably from about 40% to about 100% by weight, cyclododecasulfur compound based on the total weight of the vulcanizing composition. While these ranges are preferred, it will be understood by one of ordinary skill that vulcanizing compositions with amounts of cyclododecasulfur compound lower than the preferred ranges may be contemplated when the vulcanizing composition further includes as a component of the vulcanizing agent other known vulcanizing agents such as for example polymeric sulfur, cyclooctasulfur and the like. A preferred vulcanizing composition of the present invention therefore includes a vulcanizing agent that optionally further includes one or more sulfur-containing curatives selected from the group consisting of polymeric sulfur and cyclooctasulfur.

The vulcanizing composition may also include one or more optional ingredients such as polymeric sulfur, flow aids, fatty acids, zinc oxide, accelerators, activators, prevulcanization inhibitors, acid retarders, antidegradants, plasticizers or other compounding ingredients or additives to further enhance the characteristics and/or improve the performance of the vulcanizing composition, the elastomeric formulation of which it is a component or the elastomeric article formed from the elastomeric formulation.

As discussed above, the vulcanizing composition of the present invention is preferably useful in an embodiment wherein the vulcanizable formulation is a vulcanizable elastomeric formulation and the vulcanized article is a vulcanized elastomeric article. Accordingly, in another aspect, the present invention is directed to a vulcanizable elastomeric formulation. The vulcanizable elastomeric formulation of the present invention includes at least one elastomer and a vulcanizing agent, wherein the vulcanizing agent is a cyclododecasulfur compound. Preferably, the cyclododecasulfur compound is characterized by a DSC melt point onset of from about 155° C. to about 167° C. when measured at a DSC heat rate of 20° C./minute. Preferably, the cyclododecasulfur compound is added to the elastomer by mixing a vulcanizing composition that includes the vulcanizing agent as a component with the elastomer such that the vulcanizable elastomeric formulation of the present invention preferably includes at least one elastomer and the vulcanizing composition of the present invention.

The elastomer in the elastomeric compound may be any vulcanizable unsaturated hydrocarbon elastomer known to one skilled in the art. These elastomers may include but not be limited to natural rubber (NR), styrene-butadiene rubber (SBR), butadiene rubber (BR), nitrile rubber (NBR), ethylene propylene (EP) or ethylene propylene diene monomer (EPDM), and the like. The vulcanizable elastomeric formulation may optionally also include other additives conventionally used in rubber processing, such as flow/processing aids, antioxidants, antidegradants, fatty acids, zinc oxide, accelerators, extenders, adhesion promoters, activators, bonding agents, buffers, fillers, pigments, prevulcanization inhibitors, acid retarders, plasticizers or other compounding ingredients or additives to further enhance the characteristics and/or improve the performance of the elastomeric formulation or the elastomeric article from which it is formed. Suitable accelerators may include, but not be limited to guanidines, thiazoles, sulfenamides, sulfenimides, dithiocarbamates, xanthates, thiurams, and combinations or mixtures thereof.

The amounts of the elastomeric compound and the vulcanizing agent cyclododecasulfur compound in the vulcanizable elastomeric formulation of the present invention will vary depending on a number of factors, for example intended processing conditions, concentration of vulcanizing agent in the vulcanizing composition (when such a composition is utilized) and the mechanical and other performance requirements of the resulting elastomeric article. Typically, the amount of vulcanizing agent cyclododecasulfur compound in the vulcanizable elastomeric formulation of the present invention is from 0.25 to 10 weight percent cyclododecasulfur compound based on the total weight of the elastomeric formulation. Accordingly, the vulcanizing composition is present in the vulcanizable elastomeric formulation in an amount sufficient to supply to the elastomeric formulation from 0.3 to 43 weight percent cyclododecasulfur based on the total weight of the elastomeric formulation when the cyclododecasulfur is present in the vulcanizing composition at about 80 weight percent.

In another aspect, the present invention is directed to a process for making a vulcanizable elastomeric formulation. The process generally includes mixing an elastomer with a vulcanizing agent to form a vulcanizable elastomeric formulation that includes the vulcanizing agent dispersed in the elastomeric compound, wherein the vulcanizing agent is a cyclododecasulfur compound. Preferably, the vulcanizing agent is a cyclododecasulfur compound characterized by a DSC melt point onset of from about 155° C. to about 167° C. when measured at a DSC heat rate of 20° C./minute. As the vulcanizing agent cyclododecasulfur compound is preferably mixed with the elastomer as component of a vulcanizing composition, the process preferably includes the steps of combining a vulcanizing composition with an elastomeric compound to form a vulcanizable elastomeric formulation, wherein vulcanizing composition includes as a vulcanizing agent a cyclododecasulfur compound.

In another aspect, the present invention is directed to a process for forming a vulcanized elastomeric article. This process generally includes the process steps described above for making a vulcanizable elastomeric formulation followed by forming the vulcanizable elastomeric formulation into a formed shape and vulcanizing the formed shape to form a vulcanized elastomeric article. The step of "forming" the vulcanizable elastomeric formulation as used herein typically includes one or more steps, such as for example mixing, calendering, extruding and other processing, shaping or forming steps, often applied to a vulcanizable elastomeric formulation by vulcanized article manufacturers during the manufacture of elastomeric articles such as tires and tire components. As the vulcanizing agent cyclododecasulfur compound of the vulcanizing composition of the present invention exhibits improved thermal stability over prior art sulfur vulcanizing agents, an important aspect of the present invention is that the forming step may include increasing the bulk average processing temperature of the vulcanizable elastomeric formulation to greater than 125° C. for at least a portion of the step. Accordingly, the bulk average processing temperature of the vulcanizable elastomeric formulation during the forming step is greater than 125° C. As an element of this aspect, the present invention also includes a vulcanized article formed from the vulcanized formulation of the present invention, more preferably a vulcanized elastomeric article formed from the vulcanized elastomeric formulation of the present invention.

In another aspect, the present invention is directed to a vulcanizing agent masterbatch. A vulcanizing agent masterbatch, also known as a concentrate, is a combination of ingredients purposefully formed at elevated active ingredient (e.g. vulcanizing agent) concentrations in an appropriate elastomeric carrier such that, when subsequently combined with or "let down" into an elastomer, a final vulcanizable elastomeric formulation having the desired final active ingredient concentrations is formed. The vulcanizing agent masterbatch of the present invention includes (i) a vulcanizing agent in the amount of from 40 to 90 weight percent of based on the total weight of the masterbatch and (ii) an elastomeric carrier, wherein the vulcanizing agent includes a cyclododecasulfur compound. Preferably, the cyclododecasulfur compound is characterized by a DSC melt point onset of from about 155° C. to about 167° C. when measured at a DSC heat rate of 20° C./minute. Examples of suitable elastomeric carriers are elastomers and may include but not be limited to natural rubber or any synthetic rubber, such as natural rubber (NR), styrene-butadiene rubber (SBR), butadiene rubber (BR), nitrile rubber (NBR), ethylene propylene (EP) or ethylene propylene diene monomer (EPDM), and the like. Preferably, the elastomeric carrier is selected to match or be compatible with the elastomer with which the masterbatch is combined when forming a final vulcanizable elastomeric formulation having the desired final active ingredient concentrations. The vulcanizing agent masterbatch may optionally also include other additives conventionally used in rubber processing, such as flow/processing aids, antioxidants, antidegradants, fatty acids, zinc oxide, accelerators, extenders, adhesion promoters, activators, bonding agents, buffers, fillers, pigments, prevulcanization inhibitors, acid retarders, plasticizers or other compounding ingredients or additives to further enhance the characteristics and/or improve the performance of the elastomeric formulation or the elastomeric article from which it is formed.

The present invention is also directed to a cyclododecasulfur compound characterized by a DSC melt point onset of from about 155° C. to about 167° C. when measured at a DSC heat rate of 20° C./minute. More preferably the DSC melt point onset is between 157° C. and 167° C. when measured at a DSC heat rate of 20° C./minute and most preferably the DSC melt point onset is between 160° C. and 167° C. when measured at a DSC heat rate of 20° C./minute. An important aspect of the cyclododecasulfur compounds of the present invention is that they have unexpectedly been found to exhibit an elevated melting point relative to known forms of cyclododecasulfur and therefore have been surprisingly identified as a particularly suitable vulcanizing agent for the vulcanizing composition of the present invention.

The cyclododecasulfur compounds of the present invention preferably exhibit other physical features desirable when the cyclododecasulfur is used as a vulcanizing agent in a vulcanizing composition. For example, the cyclododecasulfur compounds of the present invention are preferably in particle form with a specific surface area of no more than 50 $m^2/g$, preferably a specific surface area of no more than 25 $m^2/g$, more preferably a specific surface area of no more than 10 $m^2/g$, even more preferably a specific surface area of no more than 5 $m^2/g$ and most preferably a specific surface area of no more than 2 $m^2/g$ as measured according to the BET method. Further, the cyclododecasulfur compounds of the present invention are preferably in particle form with a median particle diameter of 0.1 to 1200 microns, more preferably 0.5 to 300 microns, most preferably 10 to 100 microns. Further, the cyclododecasulfur compounds of the present invention are preferably in particle form with a polydispersity ratio of no more than 15, more preferably a polydispersity ratio of no more than 10 and most preferably a polydispersity ratio of no more than 8.

The specific surface area, also known as the "BET" area, is a well-known measurement wherein specific surface area of a particulate material or powder is determined by physical adsorption of a gas on the surface of the solid and by calculating the amount of adsorbate gas corresponding to a multi-layer on the surface based on the Brunauer, Emmett and Teller (BET) adsorption isotherm equation. The median particle diameter, sometimes referred to as "D50", is a parameter typically used in the art to give a general indication as to the coarseness of a material. The polydispersity ratio, also referred to as "D90/D10", is a parameter that functions as an indication of the uniformity of the distribution of particle sizes. D90 is the diameter at which 90% of a sample's mass is comprised of smaller particles while D10 is the diameter at which 10% of a sample's mass is comprised of smaller particles. Accordingly, D90/D10 is the ratio of these two values.

Equipment and methods for determining particle diameters as required for D50 and D90/D10 measurements are well known in the art and commercially available, for example: Malvern (Mastersizer series), Horiba (LA series), Sympatec (Helos series) and Shimadzu (SALD series). Methods for determining the Nitrogen adsorption isotherm in conjunction with determining specific surface area, such as ASTM-D1993-03 (2013), are well known in the art. Further, equipment for determining the Nitrogen adsorption isotherm are well known and commercially available, for example from Micromeritics (Tristar II series) and Quantachrome (Nova series).

In general, the cyclododecasulfur compounds of the present invention are synthesized according to a process that includes (i) reacting cyclooctasulfur, tetramethylethylenediamine and zinc to form a tetramethylethylenediamine/$ZnS_6$ complex; and (ii) reacting said complex with an oxidizing agent under exothermic reaction conditions to form a cyclododecasulfur-containing reaction mixture that may include one or more unreacted reactants, by-products and impurities. Suitable oxidizing agents include without limitation bromine, chlorine, and thiocyanogen. Preferably, the process further includes isolating cyclododecasulfur from the cyclododecasulfur-containing reaction mixture. A suitable technique for the isolating step includes for example dissolving and recrystallizing the cyclododecasulfur from the cyclododecasulfur-containing reaction mixture, preferably using solvents selected from the group consisting of $CS_2$ and aromatic solvents.

The following examples, while provided to illustrate with specificity and detail the many aspects and advantages of the present invention, are not be interpreted as in any way limiting its scope. Variations, modifications and adaptations which do depart of the spirit of the present invention will be readily appreciated by one of ordinary skill in the art.

Analytical Methods

Differential scanning calorimetry (DSC)—

The differential scanning calorimetry method (DSC) to measure the melt point onset and melting point range of the cyclododecasulfur compound involves a first heating scan, from which are determined the melting peak temperature (Tm1) and the exothermic peak temperature (Tex1). The instrument used was a TA's Q2000 DSC (RCS) with a refrigerated cooling system. The procedure used is described herein as follows. The instrument was calibrated according to the manufacturers "User's Manual"; by setting the onset of the melting point of adamantane, indium and lead at −65.54° C., 156.60° C. and 327.47° C., respectively, and heat of fusion of indium at 6.8 cal/g. A calibration specimen of about 3.0 mg was then scanned at a rate of 20° C./min. in the presence of helium with a flow rate of 50 cc/min. For sulfur-containing specimens, a similar method was used. A TA's Tzero aluminum pan and lid along with two aluminum hermetic lids were tared on a balance. About 3.0 mg of the sulfur-containing specimen was weighed into the Tzero pan, covered with the tared lid, and crimped using a TA's sample crimper with a pair of "Black" dies. The crimped specimen from the "Black" die stand was moved to the "Blue" die stand, where two tared hermetic lids were placed on the top of the specimen pan and crimped with the top "Blue" die. An empty crimped Tzero aluminum pan and lid along with 2 hermetic lids was prepared in a similar fashion as reference. The specimen and reference pans were placed in the DSC tray and cell at room temperature. After the DSC was cooled to −5° C. using a refrigerated cooling system, the specimen was heated from −5 to 200° C. at a rate of 20° C./min in the presence of helium. "DSC melt point onset" is defined as the temperature at the start of the endothermic melting event. Data analysis was performed using TA's software, Universal V4.7A, wherein, Tm1 refers to the low melting peak temperature occurring on the melting curve, using analysis option, "Signal Maximum". Tex1 refers to the exothermic peak temperature occurring right after Tm1, using analysis option, "Signal Maximum".

UniQuant (UQ)—

Samples were also analyzed using X-ray fluorescence and the UniQuant software package. UniQuant (UQ) is an x-ray fluorescence (XRF) analysis tool that affords standardless XRF analysis of samples. Samples can then be semi-quantitatively analyzed for up to 72 elements beginning with row three in the periodic table (i.e. Na to higher Z). The data are mathematically corrected for matrix differences between calibration standards and samples as well as absorption and enhancement effects; i.e. inter-element effects. Some factors that can affect the quality of results include granularity in the sample (leading to shadow effects), mineralogical effects (due to sample inhomogeneity), insufficient sample size, and lack of knowledge of the sample matrix. In cases where a sample was amenable to both XRF UQ analysis and ICP-OES (i.e. quantitative) analysis generally agree within +/−10%. Samples were analyzed for Zn, Br, Cl, and S content by UQ.

NMR—

Weigh approximately 0.0200 g of sample into a vial. Weigh approximately 0.0200 g of the internal standard, 1,4-dimethoxybenzene, into the same vial. Add approximately 1 mL of pyridine-d5, or other deuterated solvent that the material is soluble in. Take a $^1H$ NMR of the material and integrate the peak at δ 3.68 (6 protons). Integrate the two peaks at δ 2.45 and δ 2.25 (16 protons). Calculate the % purity using the following equation.

% Purity=100[(mg IS/MW IS)*(∫sample/∫IS)*(6/16)*(MW sample/mg sample)]

IS=internal standard
MW=molecular weight
∫=value of the integration from the $^1H$ NMR
Raman Spectroscopy—

Raman spectrum was measured using a Renishaw inVia confocal Raman microscope and WiRE 4.1 software with a 785 nm excitation laser and a 5× magnification microscope objective.

Example 1—Preparation of (TMEDA)ZnS$_6$ Complex

Tetramethylethylenediamine (TMEDA), (408 grams) and methanol (72 grams) were added to a 3 L, 3-neck glass flask equipped with a mechanical stirrer (reaching closely to the vessel walls), thermocouple, N$_2$ bubbler, water condenser, and electrical heating mantle. The system was purged with nitrogen and the temperature of the mixture adjusted to 35° C. Freshly ground cyclooctasulfur (powder) was added over five minutes while maintaining stirring at 425-450 rpm. The temperature was increased to 45° C., whereupon 40 grams of metallic zinc powder (<10 micron particle size, >98% purity) was added over five minutes while maintaining stirring at 425-450 rpm. The gray-greenish yellow reactor contents were then heated slowly to 86° C. and agitated for 4 hours, or until yellow. Once yellow, the mixture was held for an additional two hours at temperature, with agitation. At the end of the reaction time, the flask was cooled to room temperature, the agitator turned off, and free liquid removed by vacuum extraction. Methanol (600 ml) was added to the flask to create a slurry, and agitated for one hour. The resulting slurry was then filtered on a vacuum Buchner filter (1 micron paper) and washed with two portions of 200 ml each of methanol. The solids were removed from the filter and dried overnight in a vacuum oven set at 50° C. and 0.1 MPa. Yield was close to quantitative, with 233 grams of (TMEDA) ZnS$_6$ complex, 97.5% purity by NMR analysis per the above procedure.

Example 2—Preparation of Cyclododecasufur of Present Invention (S$_{12}$) from (TMEDA)ZnS$_6$ Complex Methylene chloride (750 mL) was added to a 2 L, 4-neck glass flask equipped with a mechanical stirrer, thermocouple, N$_2$ bubbler and stopper. Bromine (16.7 g, 104.5 mmol, 1.0 eq) was weighed into a bottle containing 50 mL CH$_2$Cl$_2$ and this mixture was added to the flask. The solution was cooled to 4° C. The zinc complex, (TMEDA)ZnS$_6$, from Example 1, (97.5% pure) (40 g, 104.3 mmol, 1.0 eq), was added all at once and washed in with 50 mL CH$_2$Cl$_2$. There was an immediate exotherm to 11° C. The solution was stirred for 15 minutes, filtered, washed with cold CH$_2$Cl$_2$ and suctioned dry. The solids were slurried in THF (250 mL), filtered and suctioned dry. The resultant solids were slurried in cold CS$_2$ (155 mL), filtered and suctioned dry to afford 10.2 g of a pale yellow solid. (yield 50.8% based on sulfur in the zinc complex). Evaluation using the UQ elemental analysis method described above showed the material to be 96.6% sulfur (all cyclododecasulfur (S$_{12}$) and sulfur polymer by Raman spectroscopy), 2.67% zinc and 0.7% bromine.

The cyclododecasulfur was further purified in a two-vessel system comprising an upper 2 L, jacketed 3-neck glass flask equipped with a mechanical stirrer, fine glass fritted filter plate, thermocouple, N$_2$ bubbler, dry ice trap, and bottom valve; and a lower 2 L, jacketed 3-neck glass flask equipped with a mechanical stirrer, water-cooled condenser and 1 L glass receiver pot, thermocouple, N$_2$ bubbler, dry ice trap, and bottom valve. To initiate the purification procedure, carbon disulfide (1200 grams) was added the upper vessel along with the cyclododecasulfur from the above reaction step (10.2 g). The contents of the flask were heated to 40-42° C. with stirring. After agitation of the mixture for half of an hour, the bottom valve of the vessel was opened, and the free liquid pulled through the fritted glass filter into the lower flask. About half of the initial solids remained on the filter. The solution in the second vessel was cooled to −6° C. over a period of 20 minutes or less. During the cooling phase, fine light yellow crystalline cyclododecasulfur formed. The solution was stirred for about 15 minutes at a final temperature of −6° C., whereupon the bottom valve of the vessel was opened and the slurry of S$_{12}$—CS$_2$ was dropped onto a Buchner funnel fitted with 2 micron filter paper. The light yellow crystalline cyclododecasulfur was suctioned dry and scraped from the filter paper. The mother liquor from the final filtration was returned to the upper vessel, (containing residual solids), along with makeup CS$_2$ to give 1200 grams of liquid. The upper vessel was agitated and heated again to 40-42° C. and the filtering-cooling procedure was repeated to recover a second crop of purified cyclododecasulfur (S$_{12}$) crystals. After the final heating-dissolution step, about 0.26 grams of greenish-yellow solids remained on the upper fritted filter. The combined wet S$_{12}$ crystals were placed in a vacuum oven overnight at 30° C. and about 0.01 MPa to remove residual CS$_2$, to give 9.3 grams of dried, purified cyclododecasulfur. Evaluation by the UQ elemental method described above showed the material to be at least 99.9% sulfur (all S$_{12}$ by Raman), and less than 100 ppm of zinc and bromine. The melting point was determined first by DSC and then using a thermal resistance melting point apparatus to be 162° C. and 157° C. respectively. Overall yield of sulfur to S$_{12}$ was 46%.

Example 3—Comparison of Melting Points of Cyclododecasulfur Materials

Several batches of purified cyclododecasulfur of the present invention were prepared following the procedures exemplified by Examples 1 and 2. Each final purified material was analyzed by Raman, Uniquat® or ICP, and melt point onset measured using DSC as described above. The results are set forth in Table 1 below along with "control" cyclododecasulfur melt points extrapolated from reported data measured at a DSC heat rate of 10° C./min, 5° C./min and 2.5° C./min in Steudel, R.; Eckert, B., "Solid Sulfur Allotropes", Topics in Current Chemistry (2003).

TABLE 1

| Sample | Melting point, ° C. |
| --- | --- |
| Invention Batch 1 | 166.0 |
| Invention Batch 2 | 156.0 |
| Invention Batch 3 | 159.3 |
| Invention Batch 4 | 158.6 |
| Invention Batch 5 | 162.4 |
| Invention Batch 6 | 164.0 |
| Invention Batch 7 | 161.5 |
| Control | 153.5 |

As shown above, the cyclododecasulfur compound of the present invention exhibits a melt point onset materially and unexpectedly higher than prior art cyclododecasulfur compounds. Observed variations in melt point for the present invention were expected due to degree of impurities in the samples as detected by Raman.

As noted above, thermal stability (or resistance to thermal degradation or reversion to soluble sulfur) is an important parameter in selecting a suitable vulcanizing agent. The thermal stability performance of the present invention in mixing was demonstrated in this example 3 by mixing a previously formed composition set forth in Table 2 below

TABLE 2

| Component | phr |
|---|---|
| Natural Rubber TSR-10 | 100 |
| N-339 Carbon Black | 50 |
| Zinc Oxide | 8 |
| Stearic Acid | 2 |
| N1-(4-methylpentan-2-yl)-N4-phenylbenzene-1,4-diamine (6-PPD) | 2 |
| Total | 162 | with either 5.0 phr of commercially available polymeric sulfur (as 6.25 g Crystex® HD OT20 available from Eastman Chemical Company) to form control vulcanizable elastomeric formulations or 5.00 phr of the cyclododecasulfur of the present invention to form vulcanizable elastomeric formulations of the present invention. One (1.0) phr of a conventional vulcanization accelerator, N,N'-Dicyclohexyl-2-mercaptobenzothiazole sulfenamide (DCBS), was also added to each vulcanizable elastomeric formulation. Mixing was performed using a Kobelco 1.6 L laboratory mixer equipped with 4 wing H rotors. Formulations and discharge temperatures for the six sample items created per the above procedure are set forth below in Table 3.

TABLE 3

| Item number | 1 | 2 | 3 | 4 | 5 | 6 |
|---|---|---|---|---|---|---|
| Table I Masterbatch (phr) | 162 | 162 | 162 | 162 | 162 | 162 |
| DCBS (phr) | 1 | 1 | 1 | 1 | 1 | 1 |
| Polymeric Sulfur (phr) | | 6.25 | 6.25 | 6.25 | | |
| Cyclododecasulfur (phr) | 5.00 | | | | 5.00 | 5.00 |
| Total | 168.00 | 169.25 | 169.25 | 169.25 | 168.00 | 168.00 |
| Target Rubber discharge Temperature (° C.) | 140 | 155 | 130 | 140 | 155 | 130 |

For each sample item, the sample was discharged from the mixer and sheeted on a two roll mill equilibrated to 70° C. The rubber content of each sample was then extracted with dioxane and the soluble sulfur content of each item determined by HPLC (Agilent 1260 high performance liquid chromatography). Target temperatures, actual rubber temperature after discharge and cyclooctasulfur content reported as a percentage of initial sulfur material, is given in below in Table 4.

TABLE 4

| Item number | 1 | 2 | 3 | 4 | 5 | 6 |
|---|---|---|---|---|---|---|
| Target Temperature (° C.) | 140 | 155 | 130 | 140 | 155 | 130 |
| Discharged Rubber Temperature (° C.) | 139 | 151 | 131 | 137 | 146 | 131 |
| % cyclooctasulfur Recovered | 15.12 | 97.04 | 38.69 | 91.34 | 49.80 | 7.91 |

As demonstrated by the above, the cyclododecasulfur of the present invention exhibits markedly reduced reversion to cyclooctasulfur (and therefore improved thermal stability in rubber mixing processes) when compared to current commercially available polymeric sulfur vulcanizing agents. Further examples below also describe formation of vulcanizable elastomeric formulations of the present invention that are then subsequently tested for thermal stability/bloom resistance and also evaluated to demonstrate the efficacy of the compound of the present invention as a vulcanizing agent.

Example 4—Forming Vulcanizable Elastomeric Formulations that Include the Cyclododecasulfur Compound of the Present Invention As a first step, a precursor composition P-1 of conventional materials used in the manufacture of elastomeric articles was prepared by combining the following ingredients:

TABLE 5

| Composition P-1 | |
|---|---|
| Ingredient | Amount (phr) |
| Natural Rubber | 100 |
| Carbon Black | 50 |
| ZnO | 8 |
| Stearic Acid | 2 |
| 6PPD | 2 |

A vulcanizable elastomeric formulation of the present invention (Sample A-1) was then prepared as follows:

TABLE 6

| A-1 | |
|---|---|
| Ingredient | Weight (gms) |
| P-1 | 81 |
| DCBS | 0.5 |
| Cyclododecasulfur | 2.5 |

For comparison, control vulcanizable elastomeric formulations C-1 and C-2, were also prepared by substituting the cyclododecasulfur of the present invention in the composition described above with polymeric sulfur (for C-1) and cyclooctasulfur (rhombic or soluble) sulfur (C-2) as follows:

TABLE 7

| C-1 | |
|---|---|
| Ingredient | Weight (gms) |
| P-1 | 81 |
| DCBS (vulcanization accelerator) | 0.5 |
| Polymeric sulfur (in the form of 3.13 g Crystex ® HD OD20 commercially available from Eastman Chemical Company) | 2.5 |

TABLE 8

| C-2 | |
|---|---|
| Ingredient | Weight (gms) |
| P-1 | 81 |
| DCBS (vulcanizing accelerator) | 0.5 |
| Cyclooctasulfur (S8) | 2.5 |

In forming each of A-1, C-1 and C-2, a Brabender mixer was preheated to 80° C. then P-1 was loaded into the mixer and mixed at @ 50 rpm for 30 seconds. Mixer speed was then reduced to 35 rpm; the sulfur ingredient and accelerator added; and the resulting composition mixed at 35 rpm for an additional 90 seconds. The material was then discharged from the mixer, its temperature recorded and sheeted on a 80° C. mill.

Example 5—Thermal Stability Testing

The vulcanizable elastomeric formulations A-1 and C-1 above were placed in a preheated to about 88° C. Brabender internal mixer with the rotor speed initially set to 35 rpm. The rubber was mixed and the rotor speed was adjusted, faster or slower, such that the rubber mixture in the mixer was maintained at 125° C. for extended times to simulate possible commercial plant processing conditions such as extrusion or calendering operations. Samples were extracted from the mixer at various times as indicated in Table 9 below and the weight percent cyclooctasulfur (as the product of degradation/reversion of both polymeric sulfur and the cyclododecasulfur of the present invention) of the sample was measured using the method for cyclooctasulfur measurement described in Example 3 above. The results for weight percent cyclooctasulfur are shown in the following table 9:

TABLE 9

Wt % cyclooctasulfur in extended rubber mixes

| | Time | | | | |
|---|---|---|---|---|---|
| | 2 min | 4 min | 6 min | 8 min | 10 min |
| A-1 | 0.2 | 0.49 | 0.95 | 1.525 | 2.15 |
| C-1 | 2.15 | 2.45 | 2.7 | 2.8 | 2.85 |

At the 125° C. processing temperatures of Table 9 above, polymeric sulfur has already exceeded the bloom threshold level by almost 3× when the first sample is taken at two minutes whereas the cyclododecasulfur of the present invention may be processed on the order of 5 minutes at 125° C. before reaching the threshold bloom level. This unexpected advantage is particularly critical as many commercial factory process steps are completed in less than two minutes and often less than one minute at higher temperatures in order to maximize throughput, efficiency and production volume.

Example 6—Vulcanization Efficacy

Multiple samples of vulcanizable elastomeric formulation A-1, C-1 and C-2 were separately vulcanized at 130, 140, 155, 160, 167, and 180° C. using the Alpha Technologies Moving Die Rheometer, with four parameters related to vulcanization rates and efficiencies (Maximum Torque, Scorch Time, t90 and Maximum rate of vulcanization) measured during the vulcanization process. Maximum Torque (MH) is a measure of the formed network density with increases in modulus directly related to increases in crosslink density. Scorch Time (ts2), also known as onset of cure, is defined as the time required for the system to show a torque increase of 2 dNm above the minimum measured torque. T90 is the time required to reach 90% state of cure. Maximum rate of vulcanization (Rh) is a measure of the fastest rate of vulcanization observed during the curing cycle. The results from testing these four parameters are set forth in Tables 10 through 13 below.

TABLE 10

| Cure Property | Cure Temperature, ° C. | C-1 | A-1 in dNM | C-2 |
|---|---|---|---|---|
| MH | 130 | 26.8 | 27.4 | 27.8 |
| | 140 | 25.4 | 26.2 | 26.4 |
| | 155 | 23.8 | 24.6 | 24.7 |
| | 160 | 22.3 | 23.1 | 23.1 |
| | 167 | 21.0 | 21.8 | 21.9 |
| | 180 | 20.0 | 20.7 | 20.8 |

TABLE 11

| Cure Property | Cure Temperature C. | C-1 | A-1 in Minutes | C-2 |
|---|---|---|---|---|
| ts2 | 130 | 22.1 | 22.1 | 22.2 |
| | 140 | 9.1 | 9.5 | 9.6 |
| | 155 | 3.9 | 4.2 | 4.1 |
| | 160 | 1.7 | 1.9 | 1.8 |
| | 167 | 0.8 | 0.9 | 0.9 |
| | 180 | 0.5 | 0.5 | 0.5 |

TABLE 12

| Cure Property | Cure Temperature C. | C-1 | A-1 in Minutes | C-2 |
|---|---|---|---|---|
| t90 | 130 | 80.4 | 80.1 | 80.8 |
| | 140 | 37.9 | 37.9 | 38.7 |
| | 155 | 18.0 | 18.2 | 18.4 |
| | 160 | 8.7 | 8.8 | 8.9 |
| | 167 | 4.3 | 4.4 | 4.4 |
| | 180 | 2.3 | 2.3 | 2.3 |

TABLE 13

| Cure Property | Cure Temperature C. | C-1 | A-1 dNM/minute | C-2 |
|---|---|---|---|---|
| Rh | 130 | 0.6 | 0.6 | 0.6 |
| | 140 | 1.1 | 1.1 | 1.1 |
| | 155 | 1.9 | 2.0 | 2.0 |
| | 160 | 3.4 | 3.6 | 3.6 |
| | 167 | 6.1 | 6.5 | 6.4 |
| | 180 | 11.1 | 11.6 | 11.6 |

The data in tables 10-13 indicate that cyclododecasulfur compound of the present invention is an effective and efficient sulfur vulcanization agent.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A vulcanizing composition for use in forming a vulcanized article, said vulcanizing composition comprising a vulcanizing agent; wherein said vulcanizing agent includes a cyclododecasulfur compound, and wherein the vulcanizing composition further comprises stearic acid and a process oil.

2. The vulcanizing composition of claim 1 further comprising one or more of: a cellulosic binder, a xanthan, vegetable oil, epoxidized vegetable oil, a polymeric binder, or a dispersing agent.

3. The vulcanizing composition of claim 1 wherein said vulcanizing agent further comprises one or more sulfur-containing curatives selected from the group consisting of polymeric sulfur and cyclooctasulfur.

4. The vulcanizing composition of claim 1 wherein said cyclododecasulfur compound is characterized by a DSC melt point onset of between 155° C. and 167° C. when measured at a DSC heat rate of 20° C./minute.

5. The vulcanizing composition of claim 4 wherein said DSC melt point onset is between 157° C. and 167° C. when measured at a DSC heat rate of 20° C./minute.

6. The vulcanizing composition of claim 1, wherein the cyclododecasulfur compound is in particle form with a median particle diameter of 0.1 to 1200 microns.

7. The vulcanizing composition of claim 6 wherein the median particle diameter is from 0.5 to 300 microns.

8. The vulcanizing composition of claim 1, wherein the cyclododecasulfur compound is in particle form with a polydispersity ratio of no more than 15.

9. The vulcanizing composition of claim 8, wherein the polydispersity ratio is no more than 10.

10. The vulcanizing composition of claim 9 wherein the polydispersity ratio is no more than 8.

11. The vulcanizing composition of claim 9 wherein the particles have a specific surface area of no more than 50 $m^2/g$ as measured according to the BET method.

\* \* \* \* \*